United States Patent
Takahashi et al.

(10) Patent No.: US 12,255,479 B2
(45) Date of Patent: Mar. 18, 2025

(54) POWER SUPPLY DEVICE AND VEHICLE

(71) Applicant: TOYOTA JIDOSHA KABUSHIKI KAISHA, Toyota (JP)

(72) Inventors: Ryosuke Takahashi, Nagakute (JP); Yuki Sano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/191,995

(22) Filed: Mar. 29, 2023

(65) Prior Publication Data

US 2023/0411981 A1 Dec. 21, 2023

(30) Foreign Application Priority Data

Jun. 16, 2022 (JP) .................................. 2022-097265

(51) Int. Cl.
*H02J 7/00* (2006.01)
*B60R 16/033* (2006.01)
*H01M 10/46* (2006.01)

(52) U.S. Cl.
CPC ............ *H02J 7/007* (2013.01); *B60R 16/033* (2013.01); *H01M 10/46* (2013.01)

(58) Field of Classification Search
CPC ........ H02J 7/007; B60R 16/033; H01M 10/46
See application file for complete search history.

(56) References Cited

U.S. PATENT DOCUMENTS

| | | | |
|---|---|---|---|
| 2014/0077771 A1* | 3/2014 | Yamashita | ................ B60L 1/00 320/167 |
| 2018/0041048 A1* | 2/2018 | Yang | ...................... B60R 16/03 |
| 2019/0312456 A1 | 10/2019 | Iwasaki | |
| 2022/0021233 A1 | 1/2022 | Kambara | |

FOREIGN PATENT DOCUMENTS

| | | |
|---|---|---|
| JP | 2020-92476 A | 6/2020 |
| JP | 6732831 B2 | 7/2020 |

\* cited by examiner

*Primary Examiner* — Daniel Cavallari
(74) *Attorney, Agent, or Firm* — Oblon, McClelland, Maier & Neustadt, L.L.P.

(57) ABSTRACT

A power supply device for controlling power supply from a power supply source to loads, comprising: a power storage element; a first circuit that connects the power supply source and the power storage element so as to be chargeable; a second circuit that connects the power storage element and the loads so as to be dischargeable; a third circuit that connects the power supply source and the loads so as to be able to supply power; and a control unit that controls the first circuit so as to charge the power storage element with the power of the power supply source when a predetermined signal is detected, and controls the third circuit so as to supply the power of the power supply source to the loads.

7 Claims, 6 Drawing Sheets

POWER SUPPLY DEVICE AND VEHICLE

CROSS-REFERENCE TO RELATED APPLICATION

This application claims priority to Japanese Patent application Ser. No. 2022-097265 filed on Jun. 16, 2022 incorporated herein by reference in its entirety.

BACKGROUND

1. Technical Field

The present disclosure relates to a power supply device that controls power supply from a power supply source to loads, and a vehicle equipped with the power supply device.

2. Description of Related Art

Japanese Unexamined Patent Application Publication No. 2020-092476 (JP 2020-092476 A) discloses a power supply device that backs up the supply of power to a load to which power is supplied from a battery when the battery is normal, by using power charged in a capacitor when the battery is abnormal.

SUMMARY

In a power supply device described in JP 2020-092476 A, for example, when power supply from the power supply device to a load is required, such as when failure diagnosis of the load is performed at the timing of ignition-on for a vehicle, a capacitor is charged with power of the battery, and then charging power is supplied from the capacitor to the load.

In order to shorten a time until the failure diagnosis of the load is started, it is necessary to quickly complete charging of the capacitor by increasing the current capacity of a charging circuit. However, in order to realize this, there arises a problem in which the size of the charging circuit increases, a problem in which the wiring diameter increases, and the like. Therefore, there is room for improvement in the configuration of the power supply device.

The present disclosure has been made in view of the above problems. An object of the present disclosure is to provide a power supply device and the like capable of shortening a time from the timing when the failure diagnosis of the load is required to the start of the failure diagnosis.

In order to solve the above problems, an aspect of the disclosed technique is a power supply device for controlling power supply from a power supply source to loads.

The power supply device includes:
  a power storage element;
  a first circuit for connecting the power supply source and the power storage element so as to be chargeable;
  a second circuit for connecting the power storage element and the loads so as to be dischargeable;
  a third circuit for connecting the power supply source and the loads so as to be able to supply power; and
  a control unit for controlling the first circuit such that the power storage element is charged with power of the power supply source and for controlling the third circuit such that the power of the power supply source is supplied to the loads, when a predetermined signal is detected.

With the power supply device according to the present disclosure described above, when the predetermined signal requiring failure diagnosis of a load is detected, the first circuit and the third circuit are operated at the same time, so that it is possible to shorten the time from the timing when the failure diagnosis of the load is required to the start of the failure diagnosis.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

When a signal indicating that a failure diagnosis of a load is necessary is detected, the power supply device of the present disclosure supplies the power of the power supply source to a plurality of loads in parallel with the charging of the power storage element. This eliminates the need to wait for the charge completion of the power storage element. It is possible to shorten the time from the timing when the failure diagnosis of the load is required to the start of the failure diagnosis. Hereinafter, embodiments of the present disclosure will be described in detail with reference to the drawings.

EMBODIMENT

Configuration

Figure 1:
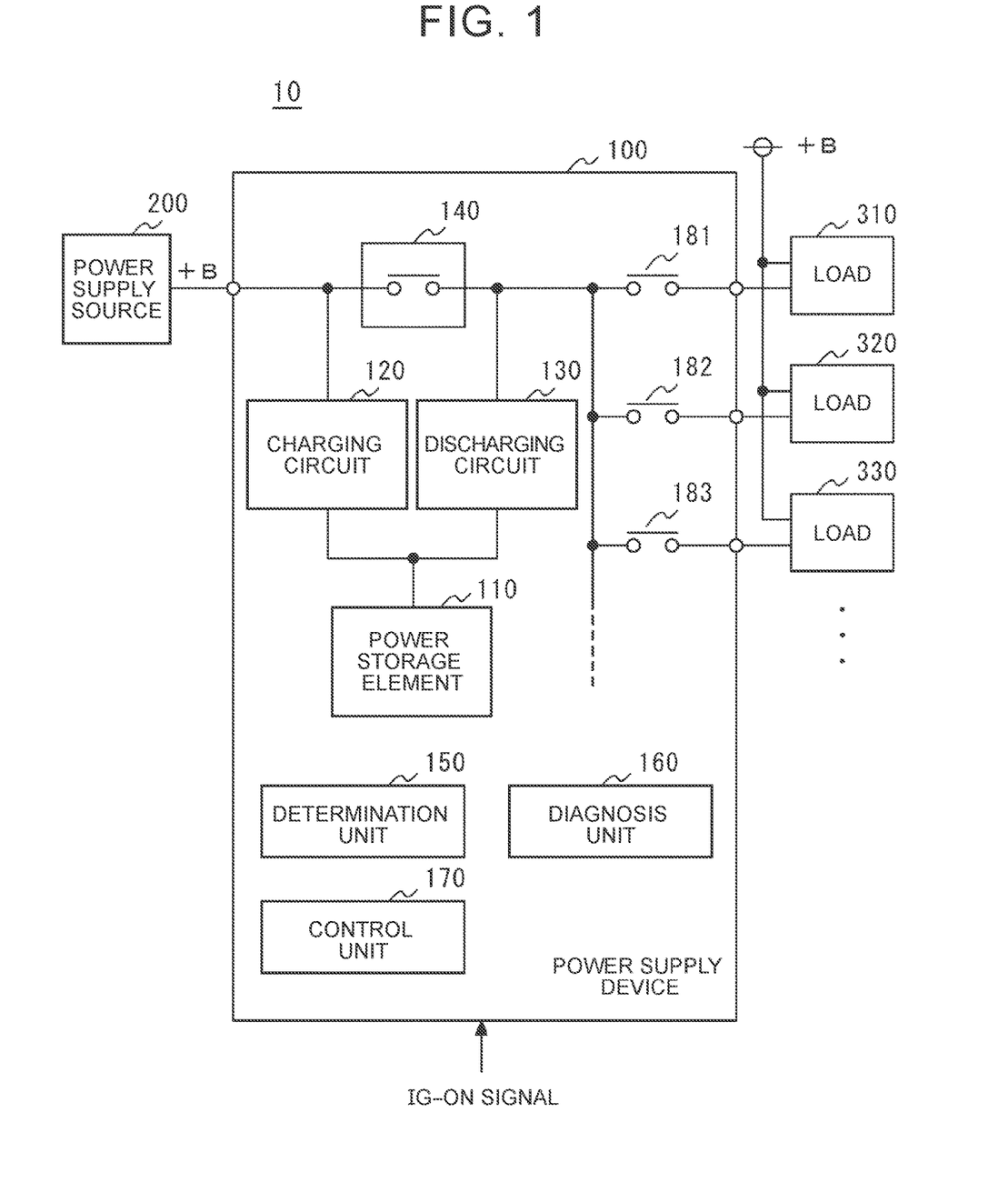
FIG. 1 is a schematic configuration diagram of a power supply device according to an embodiment of the present disclosure.

FIG. 1 is a schematic configuration diagram of a system 10 including a power supply device 100 according to an embodiment of the present disclosure. The system 10 illustrated in FIG. 1 includes a power supply device 100, a power supply source 200, and a plurality of loads 310 to 330. The system 10 can be mounted on, for example, a vehicle.

The power supply source 200 is a main power supply (primary power supply) that supplies power to the plurality of loads 310 to 330. As the power supply source 200, when the system 10 is mounted on a vehicle, a predetermined power source (+B power source) such as an alternator for generating power, a DC-DC converter for converting generated power into a predetermined voltage, and a secondary battery such as an auxiliary battery configured to be chargeable and dischargeable can be exemplified.

The plurality of loads 310 to 330 are connected to the power supply source 200 either directly (e.g., via a zigzag line) or indirectly (e.g., via a predetermined ECU). The plurality of loads 310 to 330 are predetermined devices that are supplied with power from a main power supply (+B power supply) based on the power supply source 200. The number of loads 310 to 330 is not limited to that shown in FIG. 1. Examples of the plurality of loads 310 to 330 include a backup target load (for example, an automatic driving system in the case of a vehicle) that requires a redundant power supply configuration using the power supply device 100.

The power supply device 100 is a power supply for backing up and supplying power to the plurality of loads 310 to 330 when an abnormality occurs in the power supply from the power supply source 200 to the plurality of loads 310 to 330 due to, for example, a power supply failure of the power supply source 200. The power supply device 100 is a sub power supply (secondary power supply) based on the power supply source 200.

The power supply device 100 illustrated in FIG. 1 includes a power storage element 110, a charging circuit 120, a discharging circuit 130, a relay circuit 140, a determination unit 150, a diagnosis unit 160, a control unit 170, and a plurality of load relays 181 to 183.

The power storage element 110 is, for example, a secondary battery such as a lithium-ion battery configured to be chargeable and dischargeable, a capacitor, or the like. The power storage element 110 is connected to the charging circuit 120 so that the power of the power supply source 200 can be charged. Further, the power storage element 110 is connected to the discharging circuit 130 so that the electric power stored by itself can be discharged to the plurality of loads 310 to 330.

The charging circuit 120 is a circuit (first circuit) for inputting power of the power supply source 200 and outputting the power to the power storage element 110. For example, DC-DC converters can be used for the charging circuit 120. The charging circuit 120 can charge the power supplied from the power supply source 200 to the power storage element 110 based on an instruction (such as a voltage command value) from the control unit 170.

The discharging circuit 130 is a circuit (second circuit) for outputting power input from the power storage element 110 to the plurality of loads 310 to 330. Further, the discharging circuit 130 can also input electric power from the power supply source 200 via the relay circuit 140 and output the electric power to the power storage element 110. DC-DC converters can be used for the discharging circuit 130. DC-DC converter can convert the electric power supplied from the power supply source 200 into a predetermined voltage via the relay circuit 140, charge the power storage element 110, or convert the electric power (backup electric power) stored in the power storage element 110 into a predetermined voltage, and supply the electric power (backup electric power) to the plurality of loads 310 to 330 via the plurality of load relays 181 to 183, based on an instruction (such as a voltage command value) from the control unit 170.

The relay circuit 140 is a circuit (third circuit) including a switch element such as a relay that can switch the state of electrical conduction/interruption based on an instruction from the control unit 170. One terminal of the relay circuit 140 is connected to a connection point between the power supply source 200 and the charging circuit 120. The other terminal of the relay circuit 140 is connected to a connection point between the discharging circuit 130 and the plurality of load relays 181 to 183. That is, the relay circuit 140 functions as a pass-through circuit that shortcuts the charging circuit 120 and the discharging circuit 130 and directly connects the power supply source 200 and the plurality of load relays 181 to 183. The relay of the relay circuit 140 may be a mechanical relay of an exciting type or a semiconductor relay using a field-effect transistor (e.g., a MOSFET).

The plurality of load relays 181 to 183 are switch elements that can switch the state of electrical conduction/disconnection based on an instruction from the control unit 170. One terminal of the load relay 181 is connected to a connection point between the relay circuit 140 and the discharging circuit 130. The other terminal of the load relay 181 is connected to the load 310. One terminal of the load relay 182 is connected to a connection point between the relay circuit 140 and the discharging circuit 130. The other terminal of the load relay 182 is connected to the load 320. One terminal of the load relay 183 is connected to a connection point between the relay circuit 140 and the discharging circuit 130. The other terminal of the load relay 183 is connected to the load 330. The number of load relays 181 to 183 is not limited to that shown in FIG. 1. The number of the plurality of load relays 181 to 183 increases or decreases according to the number of the plurality of loads 310 to 330.

The determination unit 150 is a configuration for determining whether or not each load is in a predetermined state in which failure diagnosis can be performed for each of the plurality of loads 310 to 330. The predetermined state is a state in which the load can maintain safety even if the load operates in the execution of the failure diagnosis or the like. When the system 10 is mounted on a vehicle, the safety state of the load can be determined based on the vehicle state such as the speed of the vehicle and the inclination of the vehicle body. For a load determined to be in a safe state, conduction of the corresponding load relay is permitted.

The diagnosis unit 160 is a configuration for performing failure diagnosis of a load. In the determination by the determination unit 150, this failure diagnosis is performed with respect to a load for which conduction of the load relay is permitted. The presence or absence of a failure is appropriately determined based on a voltage applied to a load by conduction of a load relay, a temporal change in a current flowing in the load, and the like. The voltage and the current can be acquired by using a voltage sensor, a current sensor, or the like included in the power supply device 100. The result of the failure diagnosis is notified to a predetermined configuration from the diagnosis unit 160 as necessary.

The control unit 170 is configured to perform switching control of conduction/interruption of the relay circuit 140, switching control of conduction/interruption of each of the plurality of load relays 181 to 183, control of operation/non-operation of the charging circuit 120, and control of operation/non-operation of the discharging circuit 130. The control unit 170 controls the state of the relay circuit 140, the state of the charging circuit 120, and the state of the discharging circuit 130 based on at least detection of a predetermined signal. The predetermined signal includes an IG-ON signal indicating that the ignition has been turned on when the system 10 is mounted on a vehicle.

Note that some or all of the configuration of the power supply device 100 may typically be configured as an electronic control unit (ECU) including a processor, a memory, an input/output interface, and the like. The electronic control device realizes some or all of the functions of the charging circuit 120, the discharging circuit 130, the determination unit 150, the diagnosis unit 160, and the control unit 170 by the processor reading and executing the program stored in the memory.

Control

Next, referring further to FIG. 2, FIG. 3A, FIG. 3B, FIG. 4A, and FIG. 4B, several embodiments of the control performed by the power supply device 100 when the system 10 is mounted on a vehicle will be described.

(1) First Example

Figure 2:
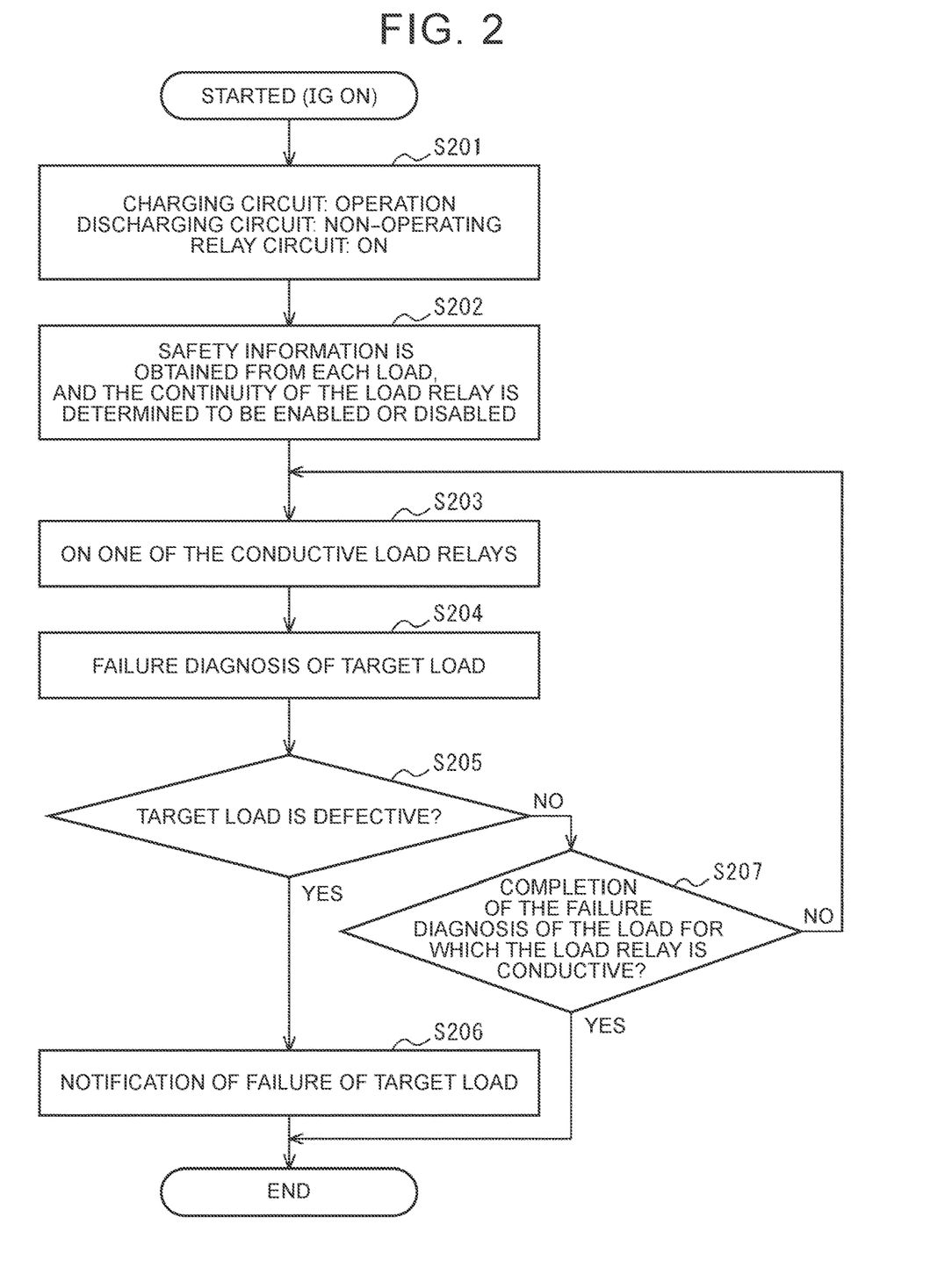
FIG. 2 is a processing flowchart of the failure diagnostic control of the first example executed by the power supply device.

FIG. 2 is a flowchart illustrating a processing procedure of the first example of the failure diagnostic control executed by each configuration of the power supply device 100. The failure diagnostic control of the first embodiment shown in FIG. 2 is started when an IG-ON is detected by the power supply device 100. This first example is a failure diagnostic control executed when main power is supplied from a main power supply (primary system power supply) to a plurality of loads 310 to 330 in response to ignition-on of the vehicle. Note that, in the stopped state of the vehicle prior to IG-ON being detected, the relay circuit 140 and the plurality of load relays 181 to 183 are in the shut-off (OFF) state.

S201 of Steps

The control unit 170 controls the charging circuit 120 to an operating state. The control unit 170 controls the discharging circuit 130 to be in a non-operating state. The control unit 170 controls the relay circuit 140 to be in a conductive (ON) condition. By this control, the sub power is output from the power supply source 200 to the power storage element 110 and the plurality of load relays 181 to 183 in parallel. When the state of the charging circuit 120, the state of the discharging circuit 130, and the state of the relay circuit 140 are controlled by the control unit 170, the process proceeds to S202 of steps.

S202 of Steps

The determination unit 150 acquires, from each of the plurality of loads 310 to 330, safety information that is information regarding whether or not the load can operate safely. Whether or not the load can operate safely is determined by each load operating with the main power supplied from the main power supply based on the vehicle state. Then, the determination unit 150 determines whether or not conduction of the plurality of load relays 181 to 183 is possible based on the safety information acquired from the plurality of loads 310 to 330. Specifically, the determination unit 150 determines that conduction of a load relay (for example, the load relay 181) for supplying sub-power to a load (for example, the load 310) determined to be able to operate safely is possible. When the determination unit 150 determines that the plurality of load relays 181 to 183 are conductive or non-conductive, the process proceeds to S203 of steps.

S203 of Steps

The control unit 170 controls any one of the load relays determined by the determination unit 150 to be conductive (ON). By this control, sub power is supplied from the power supply source 200 to a load (hereinafter referred to as "target load") connected to the load relay controlled to be in the conductive state. The selection of the load relay to be controlled to the conduction state may be performed randomly. The selection of the load relay to be controlled to the conduction state may be performed based on a predetermined order. The selection of the load relay to be controlled to the conduction state may be performed based on the priorities given to the respective loads in advance. When one of the conductive load relays is controlled to be conductive by the control unit 170, the process proceeds to S204 of steps.

S204 of Steps

The diagnosis unit 160 performs failure diagnosis of the target load. Well-known techniques can be used for this failure diagnosis. When the failure diagnosis of the target loads is performed by the diagnosis unit 160, the process proceeds to step S205.

S205 of Steps

As a result of the failure diagnosis, the diagnosis unit 160 determines whether or not the target load has failed. The presence or absence of a failure is determined based on, for example, a voltage applied to a target load by sub-power, a temporal change in a current flowing through the load, or the like. When the diagnosis unit 160 determines that the target loads have failed (Step S205: Yes), the process proceeds to Step S206. On the other hand, if the diagnosis unit 160 determines that the target loads have not failed (step S205, No), the process proceeds to step S207.

S206 of Steps

The diagnosis unit 160 notifies that the target load has failed. The failure of the target load may be notified to the target load (or all loads 310 to 330) by the dialog. The failure of the target load may be notified (for example, a failure display or a stop recommendation) to a driver of the vehicle via a predetermined display device, an audio device, or the like. When the failure of the target load is notified by the diagnosis unit 160, the failure diagnostic control of the first example ends.

S207 of Steps

The diagnosis unit 160 determines whether or not the execution of the failure diagnosis has been completed for the load for which the determination unit 150 has determined that the load relay can be conducted. When the diagnosis unit 160 determines that the failure diagnosis of the load to which the load relay can be conducted has not been completed (step S207, No), the process proceeds to step S203 in order to perform the failure diagnosis on the load for which the failure diagnosis has not been performed yet. On the other hand, when the diagnosis unit 160 determines that the failure diagnosis of the load to which the load relay can be turned on has been completed (Step S207: Yes), the failure diagnostic control of the first embodiment ends.

Note that, in the above-described step S207, when the diagnosis unit 160 determines that the failure diagnosis of the load capable of conducting the load relay has been completed, and there is no need to supply the sub-power of the power supply source 200 to the plurality of loads 310 to 330, the control unit 170 may control the relay circuit 140 to be shut off (OFF). Also, to reduce dark current, all of the plurality of load relays 181 to 183 may be controlled to be OFF.

Further, in the above-described step S207, after the diagnosis unit 160 determines that the failure diagnosis of the load capable of conducting the load relays has been completed, a process of detecting the presence or absence of a failure of the main power supply (primary power supply) may be performed. If a failure of the main power supply is detected, the control unit 170 controls the relay circuit 140 to be in the shut-off (OFF) state, and controls the load relays 181 to 183 to be in the conductive (ON) state, and also controls the discharging circuit 130 to be in the operating state, whereby backup power supply from the power storage element 110 to the loads 310 to 330 is started.

Further, in the first embodiment, the process of performing the failure diagnosis sequentially for two or more loads that the load relays can conduct (steps S203 to S207) has been described, but the failure diagnosis of two or more loads may be performed in parallel. In this case, the control unit 170 controls all the load relays determined to be conductive to be conductive (ON).

(2) Second Example

Figure 3A:
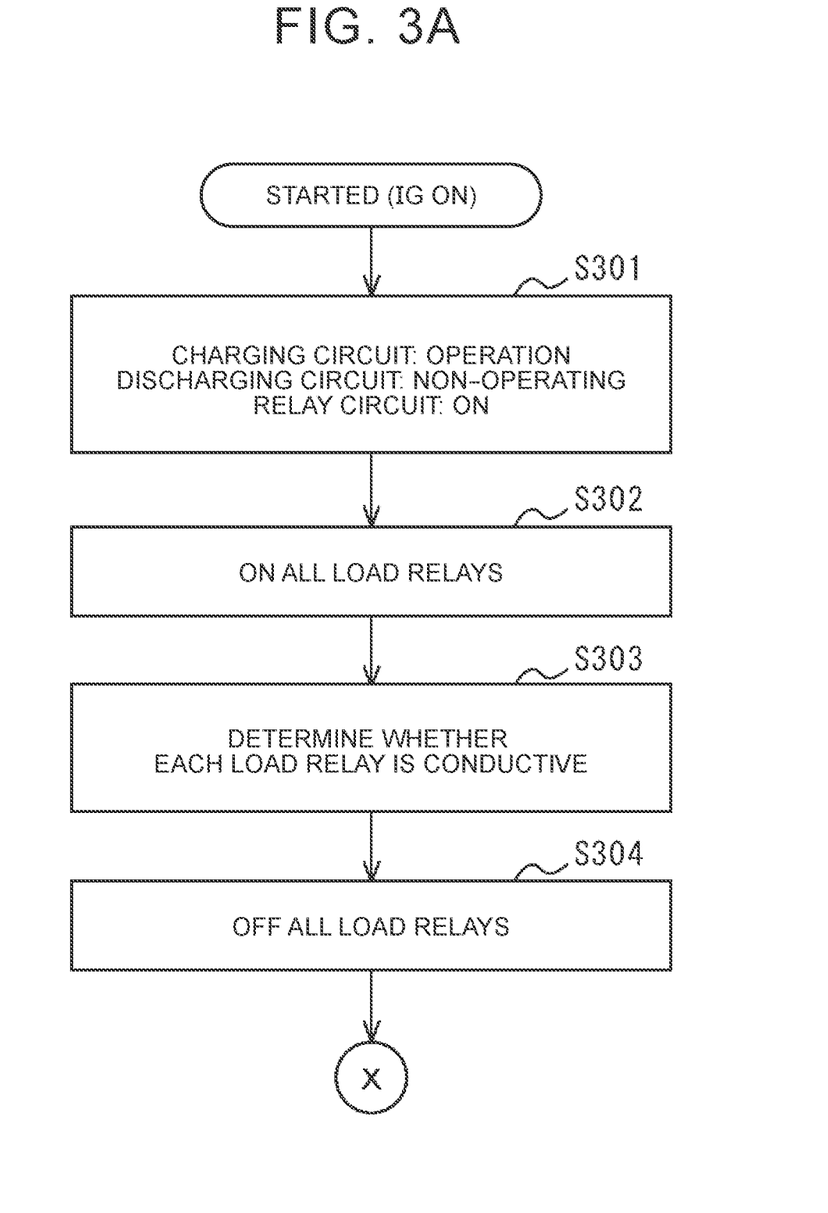
FIG. 3A is a flowchart of the failure diagnostic control of the second example executed by the power supply device.
Figure 3B:
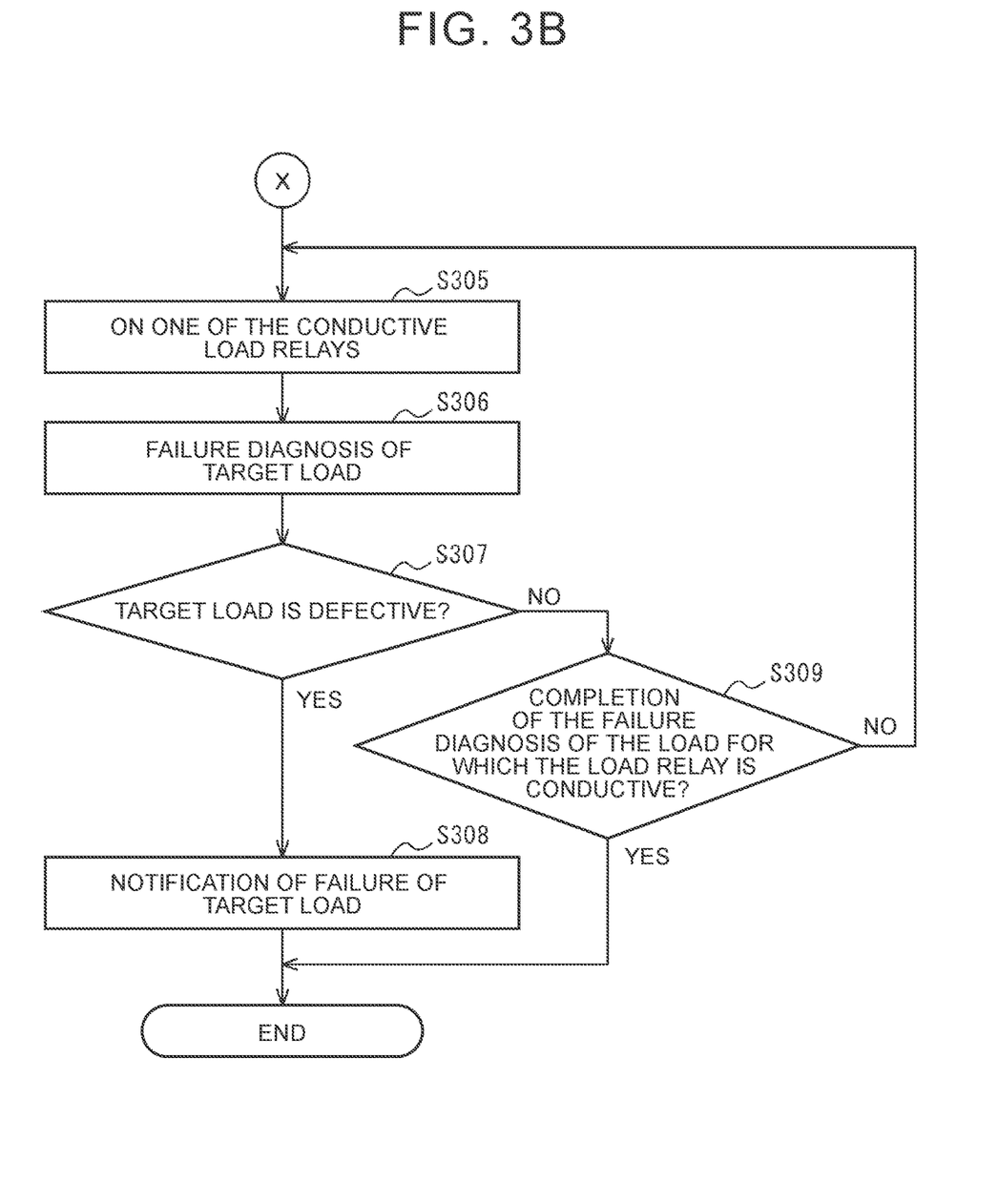
FIG. 3B is a flowchart of the failure diagnostic control of the second example executed by the power supply device.

FIGS. 3A and 3B are flow charts for explaining the process sequence of the second exemplary failure diagnostic control executed by the respective components of the power supply device 100. The process of FIG. 3A and the process of FIG. 3B are connected by a coupler X. The failure diagnostic control of the second embodiment shown in FIGS. 3A and 3B is started when an IG-ON is detected by the power supply device 100. This second example is a failure diagnostic control executed when main power is not supplied from the main power supply (primary power supply) to the plurality of loads 310 to 330 in response to ignition-on of the vehicle. Note that, in the stopped state of the vehicle prior to IG-ON being detected, the relay circuit 140 and the plurality of load relays 181 to 183 are in the shut-off (OFF) state.

S301 of Steps

The control unit 170 controls the charging circuit 120 to an operating state. The control unit 170 controls the discharging circuit 130 to be in a non-operating state. The control unit 170 controls the relay circuit 140 to be in a conductive (ON) condition. By this control, the sub power is output from the power supply source 200 to the power storage element 110 and the plurality of load relays 181 to 183 in parallel. When the state of the charging circuit 120, the state of the discharging circuit 130, and the state of the relay circuit 140 are controlled by the control unit 170, the process proceeds to S302 of steps.

S302 of Steps

The control unit 170 controls all of the plurality of load relays 181 to 183 to be conductive (ON). By this control, sub power is supplied from the power supply source 200 to all of the plurality of loads 310 to 330. When the control unit 170 controls the loads 310 to 330 to be conductive, the process proceeds to S303 of steps.

S303 of Steps

The determination unit 150 determines whether or not each of the plurality of loads 310 to 330 can operate safely (safe state). Whether or not the load can operate safely can be determined based on a voltage applied to each load by the sub-power supplied from the power supply source 200, a current flowing in each load, and the like. Then, the determination unit 150 determines whether or not conduction of the plurality of load relays 181 to 183 is possible based on the safety state determined for the plurality of loads 310 to 330. The determination unit 150 determines that the load relay (for example, the load relay 181) for supplying the sub power to the load (for example, the load 310) determined to be capable of operating safely can be conducted. When the determination unit 150 determines that the plurality of load relays 181 to 183 are conductive or non-conductive, the process proceeds to step S304.

S304 of Steps

The control unit 170 controls all of the plurality of load relays 181 to 183 to be shut off (OFF). By this control, the supply of sub-power from the power supply source 200 to all of the loads 310 to 330 is stopped. When the control unit 170 controls the loads 310 to 330 to be shut off, the process proceeds to step S305.

S305 of Steps

The control unit 170 controls any one of the load relays determined by the determination unit 150 to be conductive (ON). By this control, the sub power is supplied from the power supply source 200 to the target load connected to the load relay controlled to be in the conductive state. The selection of the load relay to be controlled to the conduction state may be performed randomly. The selection of the load relay to be controlled to the conduction state may be performed based on a predetermined order. The selection of the load relay to be controlled to the conduction state may be performed based on the priority assigned to each load in advance. When one of the load relays that can be conducted is controlled to be conducted by the control unit 170, the process proceeds to S306 of steps.

S306 of Steps

The diagnosis unit 160 performs failure diagnosis of the target load. Well-known techniques can be used for this failure diagnosis. When the failure diagnosis of the target loads is performed by the diagnosis unit 160, the process proceeds to step S307.

S307 of Steps

As a result of the failure diagnosis, the diagnosis unit 160 determines whether or not the target load has failed. The presence or absence of a failure is determined based on, for example, a voltage applied to a target load by sub-power, a temporal change in a current flowing through the load, or the like. When the diagnosis unit 160 determines that the target loads have failed (Step S307: Yes), the process proceeds to Step S308. On the other hand, if the diagnosis unit 160 determines that the target loads have not failed (step S307, No), the process proceeds to step S309.

S308 of Steps

The diagnosis unit 160 notifies that the target load has failed. The failure of the target load may be notified to the target load (or all loads 310 to 330) by the dialog. The failure of the target load may be notified (for example, a failure display or a stop recommendation) to a driver of the vehicle via a predetermined display device, an audio device, or the like. When the failure of the target load is notified by the diagnosis unit 160, the failure diagnostic control of the second example ends.

S309 of Steps

The diagnosis unit 160 determines whether or not the execution of the failure diagnosis has been completed for the load for which the determination unit 150 has determined that the load relay can be conducted. When the diagnosis unit 160 determines that the failure diagnosis of the load to which the load relay can be conducted has not been completed (step S309, No), the process proceeds to step S305 in order to perform the failure diagnosis for the load for which the failure diagnosis has not been performed yet. On the other hand, when the diagnosis unit 160 determines that the failure diagnosis of the load to which the load relay can be turned on has been completed (Step S309: Yes), the failure diagnostic control of the second embodiment ends.

Note that, in the above-described step S309, when it is determined that the diagnosis unit 160 has completed the failure diagnosis of the load capable of conducting the load relay, and there is no need to supply the sub-power of the power supply source 200 to the plurality of loads 310 to 330, the control unit 170 may control the relay circuit 140 to be shut off (OFF). Also, to reduce dark current, all of the plurality of load relays 181 to 183 may be controlled to be OFF.

Further, in the above-described S309 of steps, after the diagnosis unit 160 determines that the failure diagnosis of the load capable of conducting the load relays has been completed, a process of detecting the presence or absence of a failure of the main power supply (primary power supply) may be performed. If a failure of the main power supply is detected, the control unit 170 controls the relay circuit 140 to be in the shut-off (OFF) state, and controls the load relays 181 to 183 to be in the conductive (ON) state, and also controls the discharging circuit 130 to be in the operating state, whereby backup power supply from the power storage element 110 to the loads 310 to 330 is started.

Further, in the second embodiment, the process of sequentially performing the failure diagnosis for two or more loads in which the load relays can be conducted (steps S305 to S309) has been described, but the failure diagnosis for two or more loads may be performed in parallel. In this case, the control unit 170 controls all the load relays determined to be conductive to be conductive (ON).

(3) Third Example

Figure 4A:
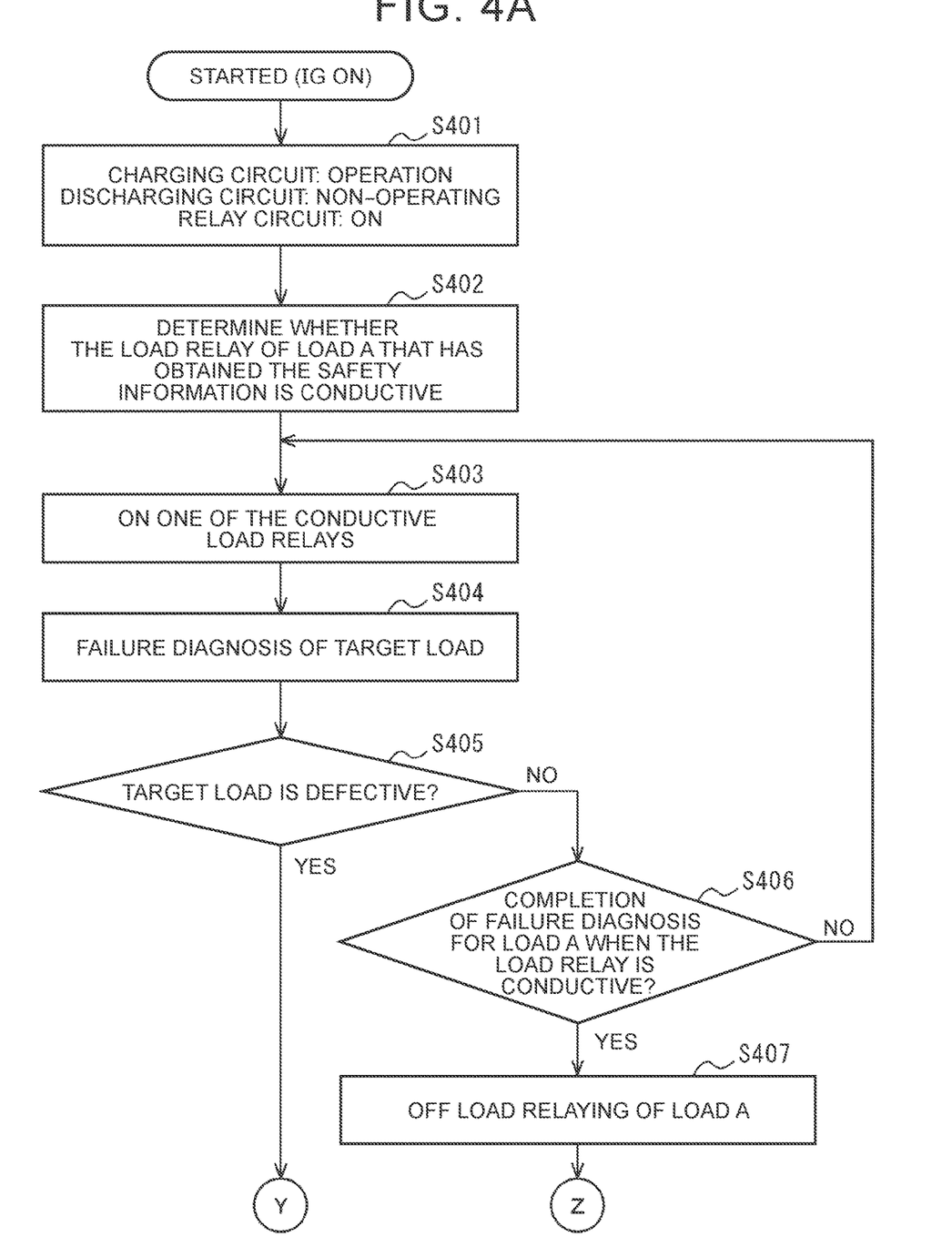
FIG. 4A is a flowchart of the failure diagnostic control of the third example executed by the power supply device.
Figure 4B:
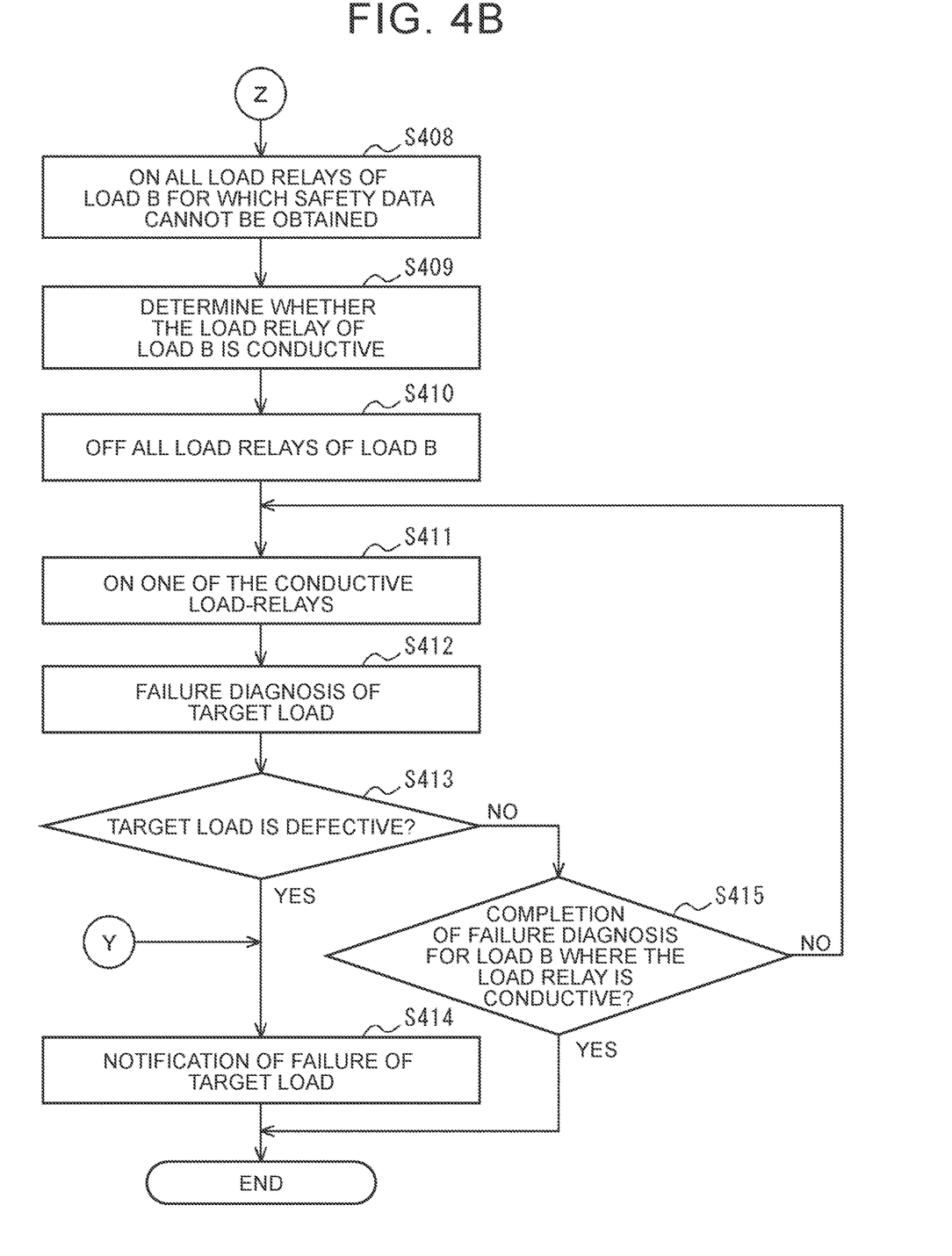
FIG. 4B is a process flowchart of a third exemplary failure diagnostic control performed by the power supply device.

FIGS. 4A and 4B are flow charts for explaining the process sequence of the third failure diagnostic control executed by the respective components of the power supply device 100. The process of FIG. 4A and the process of FIG. 4B are connected by the couplers Y and Z. The failure diagnostic control of the third embodiment shown in FIGS. 4A and 4B is started when an IG-ON is detected by the power supply device 100. This third example is a failure diagnostic control executed when a load to which main power is supplied from a main power supply (primary system power supply) and a load to which power is not supplied from the main power supply are mixed in accordance with the ignition on of the vehicle. Note that, in the stopped state of the vehicle prior to IG-ON being detected, the relay circuit 140 and the plurality of load relays 181 to 183 are in the shut-off (OFF) state.

S401 of Steps

The control unit 170 controls the charging circuit 120 to an operating state. The control unit 170 controls the discharging circuit 130 to be in a non-operating state. The control unit 170 controls the relay circuit 140 to be in a conductive (ON) condition. By this control, the sub power is output from the power supply source 200 to the power storage element 110 and the plurality of load relays 181 to 183 in parallel. When the state of the charging circuit 120, the state of the discharging circuit 130, and the state of the relay circuit 140 are controlled by the control unit 170, the process proceeds to S402 of steps.

S402 of Steps

The determination unit 150 acquires, from among the plurality of loads 310 to 330, safety information that is information about whether or not the load A can operate safely from a load (hereinafter referred to as "load A") that can determine whether or not the load A can operate safely by receiving the supply of the main power from the main power supply. Then, the determination unit 150 individually determines whether or not conduction of a load relay for supplying sub-power to the load A is possible based on the acquired safety information. When the determination unit 150 determines whether the load relays of the load A are conductive or non-conductive, the process proceeds to S403 of steps.

S403 of Steps

The control unit 170 controls any one of the load relays determined by the determination unit 150 to be conductive (ON). By this control, the sub power is supplied from the power supply source 200 to the target load connected to the load relay controlled to be in the conductive state. The selection of the load relay to be controlled to the conduction state may be performed randomly in the load A. The selection of the load relay to be controlled to the conduction state may be performed based on a predetermined order in the load A. The selection of the load relay to be controlled to the conduction state may be performed based on the priority assigned to each load A in advance. When the control unit 170 controls one of the load relays that can be conducted with respect to the load A to be conducted, the process proceeds to S404 of steps.

S404 of Steps

The diagnosis unit 160 performs failure diagnosis of the target load (load A). Well-known techniques can be used for this failure diagnosis. When the failure diagnosis of the target load (load A) is performed by the diagnosis unit 160, the process proceeds to step S405.

S405 of Steps

As a result of the failure diagnosis, the diagnosis unit 160 determines whether or not the target load (load A) has failed. The presence or absence of a failure is determined based on, for example, a voltage applied to a target load (load A) by sub-power, a temporal change in a current flowing through the load, or the like. When the diagnosis unit 160 determines that the target load (load A) has failed (step S405, Yes), the process proceeds to step S414. On the other hand, when the diagnosis unit 160 determines that the target load (load A) has not failed (step S405, No), the process proceeds to step S406.

S406 of Steps

The diagnosis unit 160 determines whether or not the execution of the failure diagnosis has been completed for all of the loads A for which the determination unit 150 has determined that the load relay can be conducted. When the diagnosis unit 160 determines that the failure diagnosis of the load A to which the load relay can be conducted has not been completed (step S406, No), the process proceeds to step S403 in order to perform the failure diagnosis on the load A for which the failure diagnosis has not been performed yet. On the other hand, when the diagnosis unit 160 determines that the failure diagnosis of the load A to which the load relay can be turned on has been completed (Step S406: Yes), the process proceeds to Step S407.

S407 of Steps

The control unit 170 controls all of the load relays connected to the load A to be shut off (OFF). By this control, the supply of the sub power from the power supply source 200 to all of the loads A is stopped. When the control unit 170 controls the load A to be in the cut-off state, the process proceeds to step S408.

Stepwise S408

The control unit 170 controls all the load relays connected to the loads (hereinafter referred to as "load B") for which the determination unit 150 is unable to acquire the safety data among the plurality of loads 310 to 330 to be turned ON. The load that the determination unit 150 is unable to acquire the safety information is a load that cannot receive the supply of the main power from the main power supply in response to the ignition on of the vehicle. By this control, sub power is supplied from the power supply source 200 to all of the loads B. When all of the load relays of the load B are controlled to be conductive by the control unit 170, the process proceeds to S409 of steps.

S409 of Steps

The determination unit 150 determines whether or not the load B can operate safely (safe state). Whether or not the load B can operate safely can be determined based on a voltage applied to the load B, a current flowing through the load B, or the like by the sub power supplied from the power supply source 200. Then, the determination unit 150 determines whether or not conduction of the load relay connected to the load B is possible based on the safety state determined for the load B. When the determination unit 150 determines that the load relays of the load B are conductive or non-conductive, the process proceeds to step S410.

S410 of Steps

The control unit 170 controls all of the load relays connected to the load B to OFF status. By this control, the supply of the sub power from the power supply source 200 to all of the loads B is stopped. When the control unit 170 controls the load relays of the load B to be shut off, the process proceeds to step S411.

S411 of Steps

The control unit 170 controls any one of the load relays determined by the determination unit 150 to be conductive (ON). By this control, the sub power is supplied from the power supply source 200 to the target load connected to the load relay controlled to be in the conductive state. The selection of the load relay to be controlled to the conduction state may be performed randomly in the load B. The selection of the load relay to be controlled to the conduction state may be performed based on a predetermined order in the load B. The selection of the load relay to be controlled to the conduction state may be performed based on the priority assigned to each load B in advance. When one of the load relays that can be conducted with respect to the load B is controlled to be conducted by the control unit 170, the process proceeds to S412 of steps.

S412 of Steps

The diagnosis unit 160 performs failure diagnosis of the target load (load B). Well-known techniques can be used for this failure diagnosis. When the failure diagnosis of the target load (load B) is performed by the diagnosis unit 160, the process proceeds to step S413.

S413 of Steps

As a result of the failure diagnosis, the diagnosis unit 160 determines whether or not the target load (load B) has failed. The presence or absence of a failure is determined based on, for example, a voltage applied to a target load (load B) by sub-power, a temporal change in a current flowing through the load, or the like. When the diagnosis unit 160 determines that the target load (load B) has failed (step S413, Yes), the process proceeds to step S414. On the other hand, when the diagnosis unit 160 determines that the target load (load B) has not failed (step S413, No), the process proceeds to step S415.

S414 of Steps

The diagnosis unit 160 notifies that the target load (the load A and the load B) has failed. The failure of the target load may be notified to the target load (or all loads 310 to 330) by the dialog. The failure of the target load may be notified (for example, a failure display or a stop recommendation) to a driver of the vehicle via a predetermined display device, an audio device, or the like. When the diagnosis unit 160 notifies the failure of the target load (the load A and the load B), the failure diagnostic control of the third example ends.

S415 of Steps

The diagnosis unit 160 determines whether or not the execution of the failure diagnosis has been completed for all of the loads B for which the determination unit 150 has determined that the load relay can be conducted. When the diagnosis unit 160 determines that the failure diagnosis of the load B to which the load relay can be conducted has not been completed (step S415, No), the process proceeds to step S411 in order to perform the failure diagnosis on the load B for which the failure diagnosis has not been performed yet. On the other hand, when the diagnosis unit 160 determines that the failure diagnosis of the load B to which the load relay can be turned on has been completed (Step S415: Yes), the failure diagnostic control of the third embodiment ends.

Note that, in the above-described step S415, when the diagnosis unit 160 determines that the failure diagnosis of the load A and the load B capable of conducting the load relay has been completed, and then it is unnecessary to supply the sub-power of the power supply source 200 to the plurality of loads 310 to 330, the control unit 170 may control the relay circuit 140 to be shut off (OFF). Also, to reduce dark current, all of the plurality of load relays 181 to 183 may be controlled to be OFF.

Further, in the above-described S415 of steps, after the diagnosis unit 160 determines that the failure diagnosis of the load A and the load B capable of conducting the load relays has been completed, a process of detecting the presence or absence of a failure of the main power supply (primary power supply) may be performed. If a failure of the main power supply is detected, the control unit 170 controls the relay circuit 140 to be in the shut-off (OFF) state, and controls the load relays 181 to 183 to be in the conductive (ON) state, and also controls the discharging circuit 130 to be in the operating state, whereby backup power supply from the power storage element 110 to the loads 310 to 330 is started.

Further, in the second embodiment described above, a process of sequentially performing failure diagnosis on two or more loads A to which the load relay can conduct (steps S403 to S406) and a process of sequentially performing failure diagnosis on two or more loads B to which the load relay can conduct (steps S411 to S415) have been described. However, failure diagnosis for two or more loads A may be performed in parallel. Failure diagnosis of two or more loads B may be performed in parallel. In this case, the control unit 170 controls all the load relays determined to be conductive to be conductive (ON).

Operations and Effects

As described above, the power supply device 100 according to the embodiment of the present disclosure includes the charging circuit 120 that charges the power of the power supply source 200 to the power storage element 110, the discharging circuit 130 that discharges the power of the power storage element 110 to the plurality of loads 310 to 330, and the relay circuit 140 that directly supplies the power of the power supply source 200 to the plurality of loads 310 to 330. When IG-ON signal is detected, the power supply device 100 according to the embodiment of the present disclosure controls the charging of the power storage element 110 by the power of the power supply source 200 and the supply to the plurality of loads 310 to 330 by the power of the power supply source 200 in parallel.

By this control, it is not necessary to wait for the charge completion of the power storage element 110 at the start of the failure diagnosis of the load, and it is possible to shorten the time from the timing when the failure diagnosis of the plurality of loads 310 to 330 is required to the start of the failure diagnosis.

An embodiment of the present disclosure has been described above. However, the present disclosure can be regarded as a control method executed by a power supply device including not only a power supply device but also a processor and a memory, a control program for executing the control method, a computer-readable non-transitory storage medium storing the control program, a vehicle equipped with the power supply device, and the like.

The power supply device of the present disclosure can be used for a vehicle or the like equipped with a plurality of loads that require a redundant power supply configuration.

What is claimed is:

1. A power supply device for controlling power supply from a power supply source to loads, the power supply device comprising:
    a power storage element;
    a first circuit for connecting the power supply source and the power storage element so as to be chargeable;
    a second circuit for connecting the power storage element and the loads so as to be dischargeable;
    a third circuit for connecting the power supply source and the loads so as to be able to supply power;
    a control unit for controlling the first circuit such that the power storage element is charged with power of the power supply source and for controlling the third circuit such that the power of the power supply source is supplied to the loads, when a predetermined signal is detected;
    a determination unit for determining whether each of the loads is in a predetermined state; and
    a diagnosis unit for performing failure diagnosis of a load determined to be in the predetermined state in the determination unit,
    wherein when the predetermined signal is detected, the control unit controls the second circuit such that power of the power storage element is not discharged to the loads.

2. The power supply device according to claim 1, wherein the determination unit acquires information on whether the load is in the predetermined state from the loads.

3. The power supply device according to claim 1, wherein:
    the power supply device is mounted on a vehicle; and
    the predetermined signal is an ignition-ON signal indicating that ignition of the vehicle is turned on.

4. The power supply device according to claim 3, wherein:
    the third circuit is a relay for connecting the power supply source and the loads; and
    when the ignition-ON signal is detected, the control unit electrically connects the relay.

5. The power supply device according to claim 4, wherein the control unit electrically disconnects the relay when the failure diagnosis of the load by the diagnosis unit is completed.

6. The power supply device according to claim 4, wherein the control unit controls the second circuit such that the relay is electrically disconnected and the power of the power storage element is discharged to the loads, when the power supply source fails.

7. A vehicle comprising:
    the power supply device according to claim 1;
    the power supply source; and
    the loads.

* * * * *